(12) United States Patent
Cassou et al.

(10) Patent No.: US 11,465,747 B2
(45) Date of Patent: Oct. 11, 2022

(54) OVERHEAD SUPPORT PLATFORM SYSTEM FOR A VEHICLE

(71) Applicant: THE BOEING COMPANY, Chicago, IL (US)

(72) Inventors: Kevin Cassou, Everett, WA (US); Gregory A. Tubbs, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 500 days.

(21) Appl. No.: 16/527,733

(22) Filed: Jul. 31, 2019

(65) Prior Publication Data

US 2021/0031922 A1 Feb. 4, 2021

(51) Int. Cl.
*B64D 11/00* (2006.01)
*B64F 5/10* (2017.01)

(52) U.S. Cl.
CPC .............. *B64D 11/003* (2013.01); *B64F 5/10* (2017.01)

(58) Field of Classification Search
CPC .......................... B64D 11/003; B64D 11/0046
See application file for complete search history.

(56) References Cited

U.S. PATENT DOCUMENTS

| | | | | |
|---|---|---|---|---|
| 2,250,619 A | * | 7/1941 | Austin | ..................... B60R 5/003 105/325 |
| 2,284,356 A | * | 5/1942 | Arenberg | ............. B61D 37/003 105/325 |
| 2,733,887 A | * | 2/1956 | Schmidt | ................ A47B 95/008 312/238 |
| 3,355,210 A | * | 11/1967 | Cripe | ....................... B60R 5/003 224/29.5 |
| 3,443,851 A | * | 5/1969 | Earl | ..................... G11B 23/0236 D12/423 |
| 3,497,281 A | * | 2/1970 | Wilde | ..................... A47B 77/16 312/223.1 |
| 5,083,727 A | * | 1/1992 | Pompei | ................... B64D 11/04 244/118.6 |
| 5,441,326 A | * | 8/1995 | Mikalonis | ................ B60Q 3/44 105/325 |
| 5,716,027 A | * | 2/1998 | Hart | ..................... B64D 11/003 244/118.1 |
| 5,725,293 A | * | 3/1998 | Wilkening | ................ E04H 6/42 211/116 |
| 5,842,668 A | * | 12/1998 | Spencer | ............... B64D 11/003 312/246 |
| 6,318,671 B1 | * | 11/2001 | Schumacher | ........ B64D 11/003 244/118.5 |
| 6,733,061 B1 | * | 5/2004 | Dykema | .................... B60R 7/04 296/37.7 |

(Continued)

*Primary Examiner* — Jason L Vaughan
(74) *Attorney, Agent, or Firm* — The Small Patent Law Group LLC; Joseph M. Butscher

(57) ABSTRACT

A vehicle includes an interior cabin, a primary structure within the interior cabin, a plurality of securing mounts having first ends directly coupled to the primary structure, and second ends, and an overhead support platform system directly coupled to the second ends of the plurality of securing mounts. The overhead support platform system includes at least one adapter rail having a plurality of commodity mounts. At least one commodity is directly coupled to the overhead support platform system. The commodity is adaptively secured to one or more of the plurality of commodity mounts.

20 Claims, 9 Drawing Sheets

(56) References Cited

U.S. PATENT DOCUMENTS

| | | | | |
|---|---|---|---|---|
| 6,883,753 | B1 * | 4/2005 | Scown | B64C 1/06 244/118.1 |
| 7,234,666 | B2 | 6/2007 | Novak | |
| 7,527,221 | B2 * | 5/2009 | Humfeldt | B64D 11/00 248/560 |
| 8,317,132 | B2 * | 11/2012 | Pein | B64D 11/003 403/322.3 |
| 8,382,034 | B2 * | 2/2013 | Beentjes | B64D 11/00 244/118.1 |
| 8,403,266 | B2 * | 3/2013 | Fokken | B64C 1/066 244/131 |
| 8,528,859 | B2 * | 9/2013 | Gross | B64D 11/003 312/246 |
| 8,690,102 | B2 * | 4/2014 | Umlauft | B64D 11/0696 244/131 |
| 8,851,420 | B2 * | 10/2014 | Schliwa | B64D 11/003 244/117 R |
| 9,010,686 | B2 * | 4/2015 | Saint-Jaimes | B64D 11/0627 244/118.6 |
| 9,016,626 | B2 * | 4/2015 | Schliwa | B64D 11/02 244/118.5 |
| 9,051,051 | B1 * | 6/2015 | Biedscheid | B64D 11/003 |
| 9,156,554 | B2 * | 10/2015 | Grosse-Plankermann | B64D 13/00 |
| 9,499,271 | B2 | 11/2016 | Walton | |
| 9,725,189 | B2 * | 8/2017 | Umlauft | B64F 5/10 |
| 9,738,386 | B2 | 8/2017 | Walton | |
| 9,758,233 | B2 * | 9/2017 | King | B64C 1/066 |
| 9,810,249 | B2 * | 11/2017 | Schneider | F16B 1/02 |
| 9,856,022 | B2 * | 1/2018 | Schmitz | B64D 11/003 |
| 10,046,843 | B2 * | 8/2018 | Doran | B64D 11/003 |
| 10,137,974 | B2 * | 11/2018 | Ahlen | B64D 11/00 |
| 10,457,375 | B2 * | 10/2019 | Roth | B64F 5/10 |
| 10,589,863 | B2 * | 3/2020 | Maclay | B64D 11/0015 |
| 10,611,453 | B2 * | 4/2020 | Kauffman | B64F 5/10 |
| 10,766,619 | B2 * | 9/2020 | Burd | E05C 3/004 |
| 10,773,782 | B2 * | 9/2020 | Metten | B64C 1/06 |
| 10,875,651 | B2 * | 12/2020 | Pozzi | B64D 11/003 |
| 2016/0297523 | A1 | 10/2016 | Walton | |
| 2016/0297525 | A1 | 10/2016 | Walton | |
| 2017/0057612 | A1 * | 3/2017 | King | B64C 1/066 |
| 2017/0313424 | A1 | 11/2017 | Walton | |
| 2018/0319502 | A1 * | 11/2018 | Maclay | B64D 11/00 |

* cited by examiner

OVERHEAD SUPPORT PLATFORM SYSTEM FOR A VEHICLE

FIELD OF EMBODIMENTS OF THE DISCLOSURE

Embodiments of the present disclosure generally relate to an overhead support platform system for a vehicle, such as a commercial aircraft.

BACKGROUND OF THE DISCLOSURE

Commercial aircraft typically include an interior cabin that may be divided into numerous sections. A cockpit is generally separated from a passenger cabin, which may include a first class section, a business class section, and an economy or coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Overhead stowage bins are typically positioned above rows of seats within a commercial aircraft. Each overhead stowage bin is configured to be moved between an open position and a closed position. In the open position, passengers may place carry-on luggage within a moveable bin or bucket.

As a commercial aircraft is being manufactured, each stowage bin is typically secured to tie rods that are in turn secured to primary structure of a fuselage. For example, the tie rods are secured to a frame, stringers, or the like of the fuselage.

Typical stowage bins have a standard length, such as 58 inches. The tied rods extending from the primary structure of the fuselage are positioned to align with the attachment points of the stowage bins. However, if a non-standard length stowage bin is to be positioned within the aircraft, a customized tie rod configuration is used to mount the stowage bin to the primary structure of the fuselage. As can be appreciated, the process of determining a customized tie rod configuration for a non-standard stowage bin, mounting such tied rods to the primary structure, and securing the non-standard stowage bin to the customized tie rod configuration adds time and cost to the overall manufacturing process.

Moreover, the tie rods may also need to be reconfigured due to positions of monuments, such as lavatories, galleys, partitions, and the like, within the aircraft. In particular, a tie rod configuration that is used to secure a stowage bin to the primary structure of the fuselage may not align with the attachment points for a particular monument.

SUMMARY OF THE DISCLOSURE

A need exists for a system and method of efficiently coupling stowage bins, monuments, and the like to a primary structure of an aircraft. Further, a need exists for a standard and uniform secondary support system to which various different internal components of a vehicle may be secured. A need exists for an adaptable, cost-efficient system and method of securing various components within an interior cabin of an aircraft. Moreover, a need exists for a common installation system and method that may be used throughout an interior cabin of an aircraft.

With those needs in mind, certain embodiments of the present disclosure provide an overhead support platform system configured to mount to a primary structure of a vehicle through one or more securing mounts. At least one commodity within an internal structure of the vehicle is configured to mount to the overhead support platform system. The overhead support platform system includes at least one adapter rail including a plurality of commodity mounts. The commodity is configured to be adaptively secured to one or more of the plurality of commodity mounts.

In at least one embodiment, a length of the at least one adapter rail equals a length of a standard-sized stowage bin. As another example, the overhead support platform system includes a plurality of attachment fittings that directly couple to lower ends of a plurality of securing mounts. The plurality of attachment fittings correspond to attachment locations for a standard-sized stowage bin.

In at least one embodiment, the one or both of a stowage bin or a monument are adaptively secured to the overhead support platform system.

As an example, the at least one adapter rail includes a first adapter rail, and a second adapter rail coupled to the first adapter rail. One or more cross beams may couple the first adapter rail to the second adapter rail.

In at least one embodiment, the adapter rail(s) includes a lower beam, an upper beam, and a panel that connects the lower beam to the upper beam. The panel includes the plurality of commodity mounts uniformly-spaced along a length of the panel. As an example, each of the plurality of commodity mounts includes a fastener through-hole.

In at least one embodiment, the overhead support platform system also includes at least one threshold closeout bracket secured laterally away and below the adapter rail(s). The threshold closeout bracket may include at least one air passage. One or both of a lighting assembly or a plenum may be secured to the threshold closeout bracket(s).

In at least one embodiment, the overhead support platform system may also include at least one support rail that supports the at least one commodity.

Certain embodiments of the present disclosure provide a vehicle that includes an interior cabin, a primary structure within the interior cabin, a plurality of securing mounts having first ends directly coupled to the primary structure, and second ends, and an overhead support platform system directly coupled to the second ends of the plurality of securing mounts. The overhead support platform system includes at least one adapter rail having a plurality of commodity mounts. At least one commodity is directly coupled to the overhead support platform system. The commodity(ies) is adaptively secured to one or more of the plurality of commodity mounts. In at least one embodiment, the vehicle also includes a passenger service unit (PSU) coupled to the commodit(ies). The PSU rail is separate and distinct from the overhead support platform system.

Certain embodiments of the present disclosure provide a method of adaptively supporting at least one commodity within an interior cabin of a vehicle. The method includes directly coupling first ends of a plurality of securing mounts to a primary structure within the interior cabin, directly coupling an overhead support platform system to second ends of the plurality of securing mounts, and securing the at least one commodity to one or more of a plurality of commodity mounts of the overhead support platform system.

DETAILED DESCRIPTION OF THE DISCLOSURE

Figure 1:
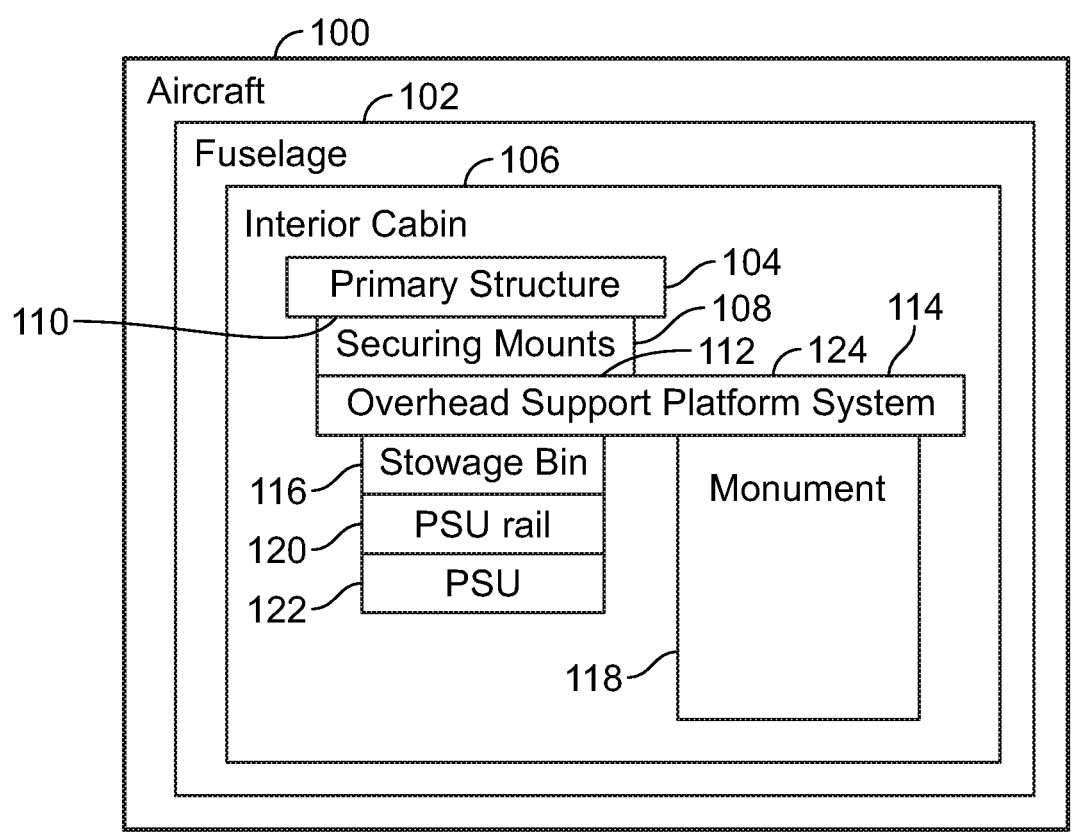
FIG. 1 illustrates a schematic box diagram of an aircraft, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide an adaptable, common installation system that may be used throughout an interior cabin of an aircraft. In at least one embodiment, an adaptable overhead support platform system provides a common installation interface throughout an interior cabin of the aircraft. The overhead support platform system may have a length that is the same as that of a standard-sized stowage bin assembly. For example, the length of the overhead support platform system may be 58 inches. In at least one embodiment, the overhead support platform system has the same attachment locations and interfaces as a standard stowage bin. As such, the overhead support platform system may be secured to a primary structure of the aircraft through standard securing mounts, which may otherwise be used to secure a stowage bin to the primary structure.

The overhead support platform system allows for a wide variety of interior configurations without the need for customized features or parts. It has been found that the overhead support platform system is lightweight, and easy to manipulate and install. Further, the overhead stowage support systems may be secured in positions where needed, thereby reducing an overall weight of the aircraft, which, in turn, leads to increased fuel efficiency. The overhead support platform system provides a one-size-fits-all assembly that is configured to support various combinations of commodities (for example, stowage bins, monuments, and the like).

Embodiments of the present disclosure provide an overhead support platform system that reduces excessive non-recurring engineering and recurring production costs for new aircraft interior configurations by reducing engineering and production hours due to having common architecture and structural support installation locations.

Certain embodiments of the present disclosure provide an aircraft interior structure that includes a plurality of uniform securing mounts (such as tie rods and/or struts) that attach to an overhead support platform system. The securing mounts have first ends that secure to primary structure of a fuselage of the aircraft. The primary structure may be one or more of a skin, frame, stringer, and the like that form the fuselage. Second ends of the securing mounts secure to the overhead support platform system at attachment fittings. The attachment fittings may be at locations that are common to those used to secure standard stowage bins to the securing mounts. The overhead support platform system may, in turn, be secured to a stowage bin and/or a monument (such as a lavatory, galley, partition, or the like). The overhead support platform system provides uniformly-spaced mounting positions to which the stowage bin and/or the monument may be secured. As such, the stowage bin and/or the monument may be secured to the overhead support platform system without the need for a customized configuration of securing mounts. Instead, the securing mounts may be regularly spaced and positioned through the interior cabin, and the overhead support platform system secures to the standardized configuration of the securing mounts.

FIG. 1 illustrates a schematic box diagram of an aircraft 100, according to an embodiment of the present disclosure. The aircraft 100 includes a fuselage 102 having at least one primary structure 104 within an interior cabin 106 of the aircraft 100. Examples of the primary structure 104 include frame(s), stringer(s), spar(s), skin(s), and/or the like.

Securing mounts 108 are secured to the primary structure 104. In particularly, first ends 110 of the securing mounts directly couple to the primary structure 104. Examples of the securing mounts 108 include struts, tie-rods, and/or the like. In at least one embodiment, the securing mounts 108 extend downwardly from a lower surface of the primary structure 104 at positions and spacings that are configured to securely couple to a standard-sized stowage bin, which may have an overall length of 58 inches. That is, the securing mounts 108 are positioned and spaced relative to one another to securely mount to attachment locations of a standard-sized stowage bin. The securing mounts 108 include the upper or first ends 110 that directly couple to the primary structure 104 and lower or second ends 112 that directly couple to an overhead support platform system 114.

The securing mounts 108 throughout the interior cabin 106 may include standard and/or uniform components. The securing mounts 108 may include a set of common parts. A geometric configuration of the securing mounts 108 attaching to each overhead support platform system 114 within the interior cabin 106 may be the same for at least two overhead support platform systems 114 within the interior cabin 106.

The overhead support platform system 114 provides a secondary support structure (in contrast to the primary structure 104) that is located between the primary structure and commodities within the interior cabin 106. Examples of the commodities include a stowage bin 116 and a monument 118 (such as lavatory, galley, partition, or the like). Thus, instead of the stowage bin 116 and the monument 118 directly coupling to the securing mounts 108, the stowage bin 116 and the monument 118 directly couple to the overhead support platform system 114, which provides an intervening, secondary support structure between the primary structure 104 and the stowage bin 116 and the monument 118. Optionally, the overhead support platform system 114 may secure to only one of the stowage bin 116 or the monument 118. That is, the overhead support platform system 114 need not directly couple to both the stowage bin 116 and the monument 118.

A passenger service unit (PSU) 120 may couple to the stowage bin 116. A PSU 122 is mounted on the PSU rail 120. As shown, the PSU rail 120 differs from the overhead support platform system 114. The PSU rail 120 and the overhead support platform system 114 are separate and distinct from one another. While the PSU rail 120 provides a mounting system for the PSU 122, the overhead support platform system 114 provides a common mounting interface that may be disposed anywhere within the interior cabin 106 to allow for various commodities to be efficiently secured thereto.

The overhead support platform system 114 provides a common mounting interface that may be used to securely couple to attachment members of the stowage bin 116 and the monument 118. For example, the overhead support platform system 114 provides uniformly-spaced mounts (such as fastener holes) that allow attachment structures of the stowage bin 116 and the monument 118 to secure thereto. As such, non-standard (whether in shape or location) stowage bins and monuments are secured to the overhead support platform system 114 without the need for reconfiguration of the securing mounts 108 within the interior cabin 106. In this manner, the overhead support platform system 114 provides a modular system that may be used to securely support a wide variety of commodities at a wide variety of locations within the interior cabin 106.

In at least one embodiment, the overhead support platform system 114 has a length that is the same as a standard-sized stowage bin. For example, the overhead support platform system 114 may have an overall length of 58 inches. In at least one embodiment, the upper portion 124 of the overhead support platform system 114 has attachment members at locations that are the same as those of the standard-sized stowage bin. As such, the securing mounts 108 may be regularly and uniformly positioned throughout the interior cabin 106 at locations that would otherwise be used to secure to a standard-sized stowage bin, but the overhead support platform system 114 secures to the securing mounts 108 and allows for adaptive and variable positioning of the commodities (such as the stowage bin 116 and the monument 118) within the interior cabin 106.

The overhead support platform system 114 provides a modular secondary support structure that may be coupled to the primary structure 104 via the securing mounts 108, or removed therefrom, at various locations along a length of the interior cabin 106. The overhead support platform system 114 is not a single, contiguous structure that spans over a substantial length (such as over a length of a particular passenger section) of the interior cabin 106.

In at least one embodiment, the overhead support platform system 114 may be used to support ceiling panels in the interior cabin 106, in the same or similar manner as how a standard stowage bin supports a ceiling panel. The overhead support platform system 114 may be interchangeable with a standard stowage bin. The overhead support platform system 114 may be configured to support various components that a standard stowage bin supports, including ceiling panels.

Figure 2:
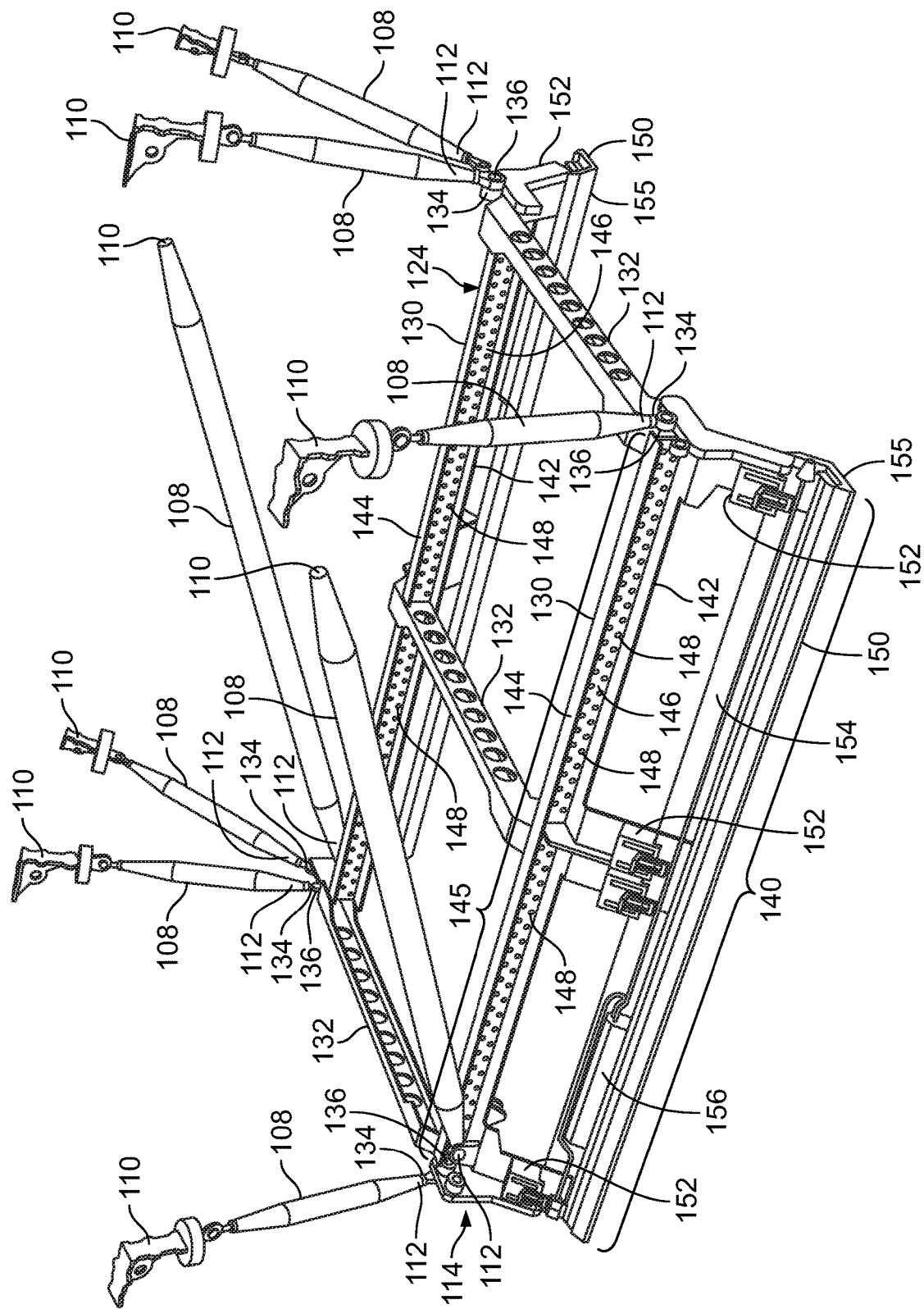
FIG. 2 illustrate a perspective top view of an overhead support platform system coupled to securing mounts, according to an embodiment of the present disclosure.
Figure 3:
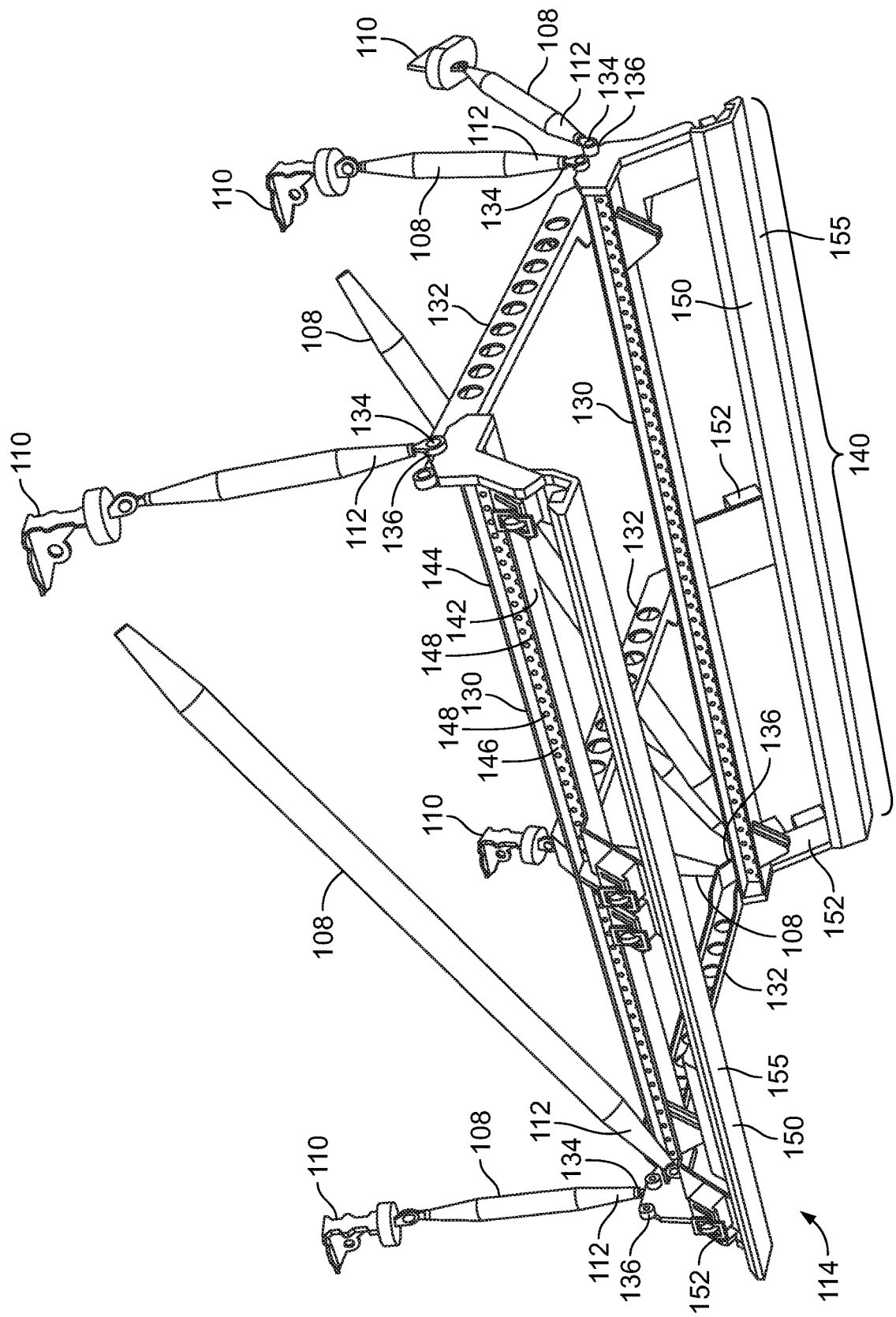
FIG. 3 illustrate a perspective bottom view of the overhead support platform system coupled to the securing mounts.

FIG. 2 illustrate a perspective top view of the overhead support platform system 114 coupled to securing mounts 108, according to an embodiment of the present disclosure. FIG. 3 illustrate a perspective bottom view of the overhead support platform system 114 coupled to the securing mounts 108. As shown in FIGS. 2 and 3, the overhead support platform system 114 includes a first adapter rail 130 spaced apart from a second adapter rail 130, which is parallel to the first adapter rail 130. The adapter rails 130 are secured together and spaced apart from one another by cross beams 132. As shown, the overhead support platform system 114 includes two parallel adapter rails 130 coupled together by three cross beams 132. Optionally, the overhead support platform system 114 may include more or less adapter rails 130. For example, the overhead support platform system 114 may include a single adapter rail 130. Also, optionally, the overhead support platform system 114 may include more or less cross beams 132. For example, the overhead support platform 114 may not include any cross beams 132, such as if the overhead support platform system 114 includes a single adapter rail 130.

The upper portion 124 of the overhead support platform system 114 includes attachment fittings 134 that securely connect to the second ends 112 of the securing mounts 108. In at least one embodiment, the securing mounts 108 are tie rods that are otherwise used to secure a stowage bin to the primary structure 104 (shown in FIG. 1). The attachment fittings 134 may be located at corners 136 of the overhead support platform system 114. In at least one embodiment, the attachment fittings 134 are located at positions that correspond to locations of attachment fittings of a standard-sized stowage bin. As such, the securing mounts 108 may be regularly-spaced throughout the interior cabin 106 (shown in FIG. 1) to correspond to positions for mounting to standard-sized stowage bins.

A length 140 of the overhead support platform system 114 may be the same as a length of a standard-sized stowage bin. For example, the length 140 may be 58 inches. In this manner, the overhead support platform system 114 may be configured to directly secure to the securing mounts 108 in the same manner as a standard-sized stowage bin, but also provide adaptability with respect to commodities securing to the overhead support platform system 114.

Each of the adapter rails 130 includes a lower beam 142 (which may be flat) connected to an upper beam 144 (which may be flat) through a panel 146 (such an upright panel), which may be perpendicular to the lower beam 142 and the upper beam 144. A plurality of regular and uniformly-spaced commodity mounts 148 are positioned along the length of the panel 146. For example, the commodity mounts 148 may be fastener through-holes that are configured to receive fasteners (for example, pins, bolts, screws, or the like) secured to attachment fittings or the like of one or more commodities. In at least one embodiment, the commodity mounts 148 may be fastener through-holes that are regularly spaced at 1 inch increments. The commodity mounts 148 may be holes having a diameter of ¼ inch. Optionally, instead of through-holes, the commodity mounts 148 may be detents, indentions, clips, latches, or the like that are configured to secure to a reciprocal mounting structure of a stowage bin, monument, or other such commodity. In at least one embodiment, the shape of the adapter rail 130 itself may provide the commodity mounts 148. For example, the reciprocal mounting structure of the commodity may clamp around and/or otherwise to a shape of the adapter rail 130. In this manner, the commodity mounts 148 along the length of the adapter rails 130 provide various locations, and therefore different positional options, for commodities to secure. As such, a customized configuration of securing mounts need not be used to secure the commodities to the primary structure 104.

In at least one embodiment, threshold closeout brackets 150 may be secured to the overhead support platform system 114. In at least one embodiment, the overhead support platform system 114 includes the threshold closeout brackets 150. The threshold closeout brackets 150 extend laterally outward from and below the adapter rails 130. For example, angled extension housings 152 may dispose the threshold closeout brackets 150 outwardly and downwardly from the adapter rails 130. In at least one embodiment, the extension housings 152 may be extensions of the cross beams 132. In at least one other embodiment, the extension housings 152 may be separate pieces that secure to the adapter rails 130 and/or the cross beams 132.

Each threshold closeout bracket 150 may be sized and shaped akin to a longitudinal valence of a stowage bin assembly. For example, the threshold closeout brackets 150 may include a contoured lower surface 155. The threshold closeout brackets 150 include an interior surface 154 that may support a lighting assembly 156. Optionally, the overhead support platform system 114 may not include the threshold closeout brackets 150, or may include just one of the threshold closeout brackets 150.

The overhead support platform system 114 shown in FIG. 2 may be used over a center section of seats within the aircraft 100 (shown in FIG. 1). For example, stowage bins 116 may be secured to the adapter rails 130 and configured to open on either side of the overhead support platform system 114.

Referring to FIGS. 1-3, the overhead support platform system 114 is configured to mount to the primary structure 104 of a vehicle, such as the aircraft 100, through one or more securing mounts 108. At least one commodity (for example, the stowage bin 116, the monument 118, and/or the like) within the interior cabin 106 of the vehicle is configured to mount to the overhead support platform system 114. The overhead support platform system 114 includes at least one adapter rail 130 including a plurality of commodity mounts 148. The commodity is configured to be adaptively secured to one or more of the plurality of commodity mounts 148, such as via one or more attachment fittings. That is, the commodity may be selectively supported along a length 145 of the adapter rail(s) 130 through the plurality of commodity mounts 148, which are spaced along the length of the adapter rail(s) 130. In at least one embodiment, the length 145 of each adapter rail 130 equals a length of a standard-sized stowage bin (for example, 58 inches).

Figure 4:
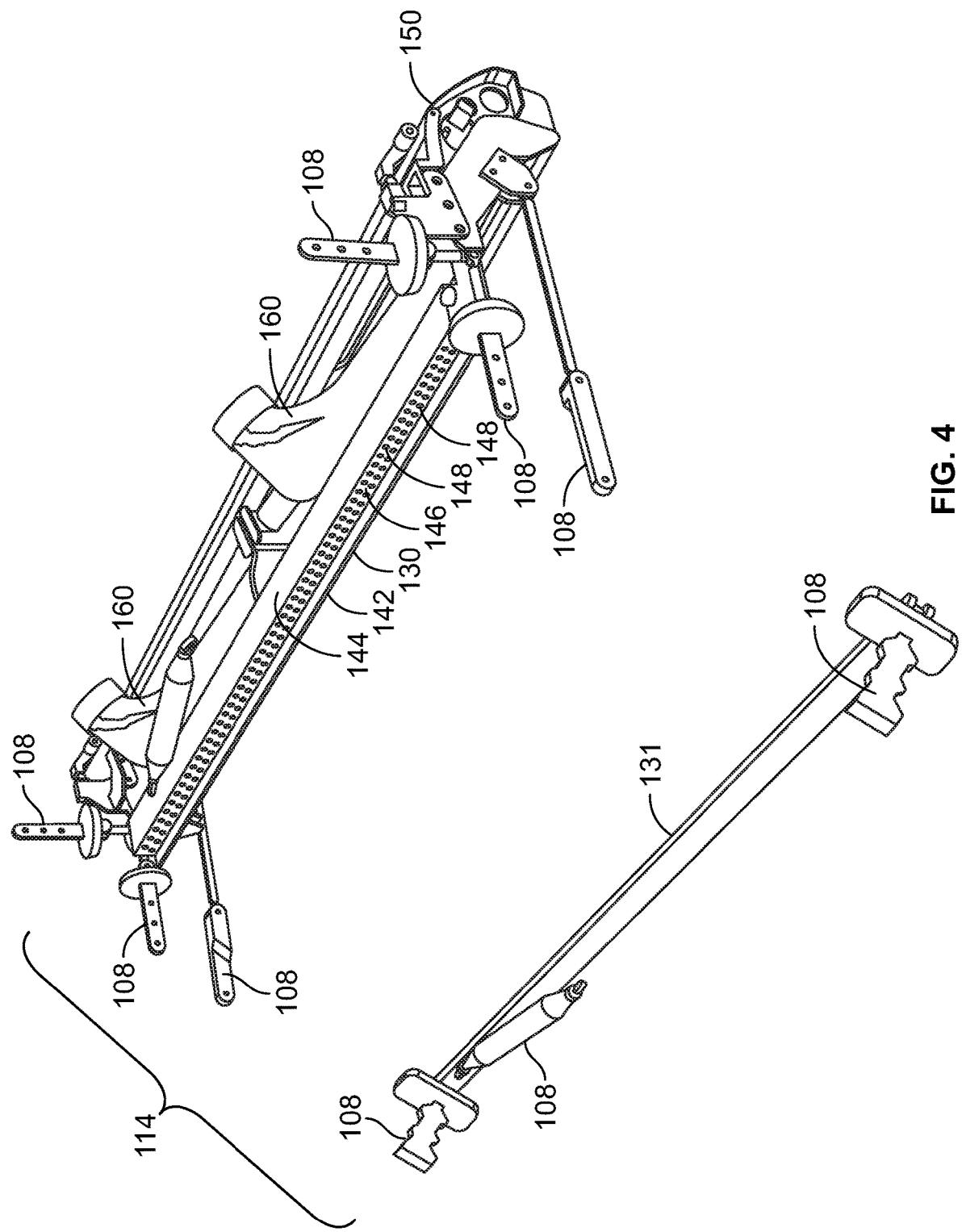
FIG. 4 illustrate a perspective top view of an overhead support platform system coupled to securing mounts, according to an embodiment of the present disclosure.
Figure 5:
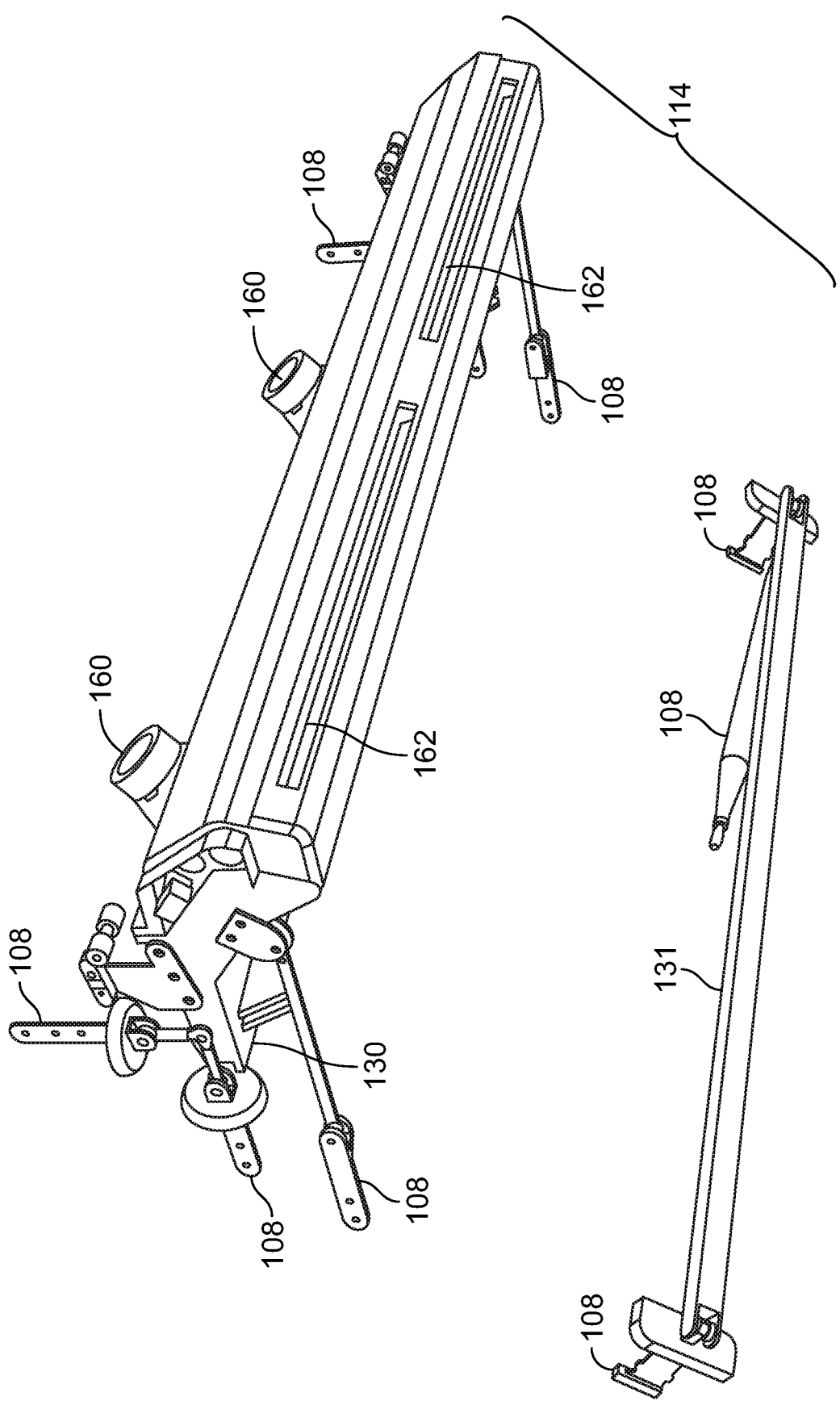
FIG. 5 illustrate a perspective bottom view of the overhead support platform system coupled to the securing mounts.

FIG. 4 illustrate a perspective top view of an overhead support platform system 114 coupled to securing mounts 108, according to an embodiment of the present disclosure. FIG. 5 illustrate a perspective bottom view of the overhead support platform system 114 coupled to the securing mounts 108. Referring to FIGS. 4 and 5, the overhead support platform system 114 includes an adapter rail 130, as described herein. A threshold closeout bracket 150 may be secured to an inboard (that is, towards a central longitudinal plane of the aircraft 100, shown in FIG. 1). An additional support rail 131 may be separated from the adapter rail 130. The support rail 131 may be configured similar to the adapter rail 130. Optionally, the support rail 131 may be a contiguous beam without any holes formed therethrough. As such, the support rail 131 may provide a support ledge for a portion of a commodity, such as a stowage bin. The support rail 131 may be used when the stowage bin 116 (shown in FIG. 1) is secured to the overhead support platform system 114. The support rail 131 may not be needed when the monument 118 (shown in FIG. 1) is secured to the adapter rail 130. The overhead support platform system 114 shown in FIGS. 4 and 5 may be used over outboard (that is, away from the central longitudinal plane of the aircraft 100) seats of an aisle, in contrast to a middle section of seats.

Plenums 160 may be secured to the threshold closeout bracket 150. The plenums 160 are in fluid communication with a ventilation system (not shown) and are configured to direct air out of, or into, air passages 162, which may be formed in the threshold closeout bracket 150. Optionally, the threshold closeout brackets 150 may not include the plenums 160 or the air passages 162.

Figure 6:
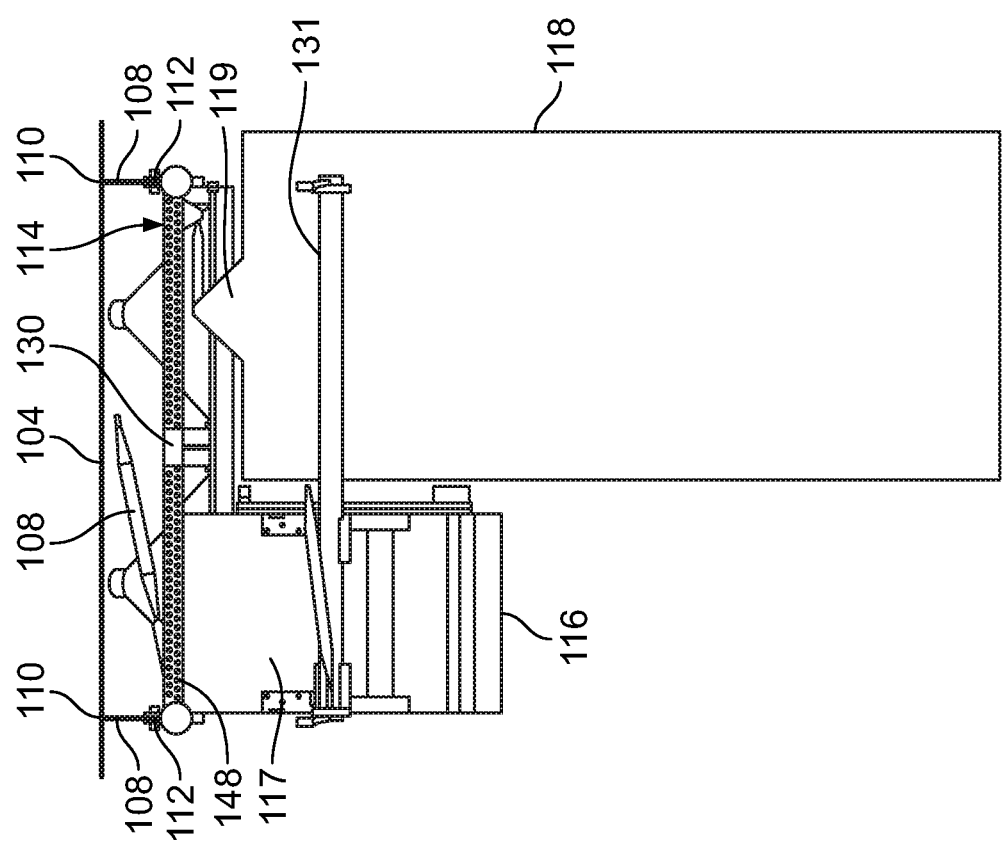
FIG. 6 illustrates an exterior lateral view of a stowage bin and a monument secured to an overhead support platform system, according to an embodiment of the present disclosure.

FIG. 6 illustrates an exterior (that is, looking from outside an interior cabin into the interior cabin) lateral view of a stowage bin 116 and a monument 118 secured to an overhead support platform system 114, according to an embodiment of the present disclosure. The first ends 110 of the securing mounts 108 directly couple to the primary structure 104, such as a frame of a fuselage. The second ends 112 of the securing mounts 108 directly coupled to the adapter rail 130.

As shown, the stowage bin 116 may be a non-standard sized stowage bin (for example, having a length less than 58 inches). The stowage bin 116 secures at a desired location along the adapter rail 130 via one or more of the commodity mounts 148. For example, attachment fittings of the stowage bin 116 securely couple to one or more of the commodity mounts 148. The support rail 131 may also directly couple to a lateral, outer portion 117 of the stowage bin 116 and also securely couple to another primary structure. The monument 118 also includes an attachment fitting 119 that secures to one or more desired commodity mounts 148 at desired positions. As such, the overhead support platform system 114 is used to securely support one or more commodities at desired positions, without the need for reconfiguration of the securing mounts 108.

Figure 7:
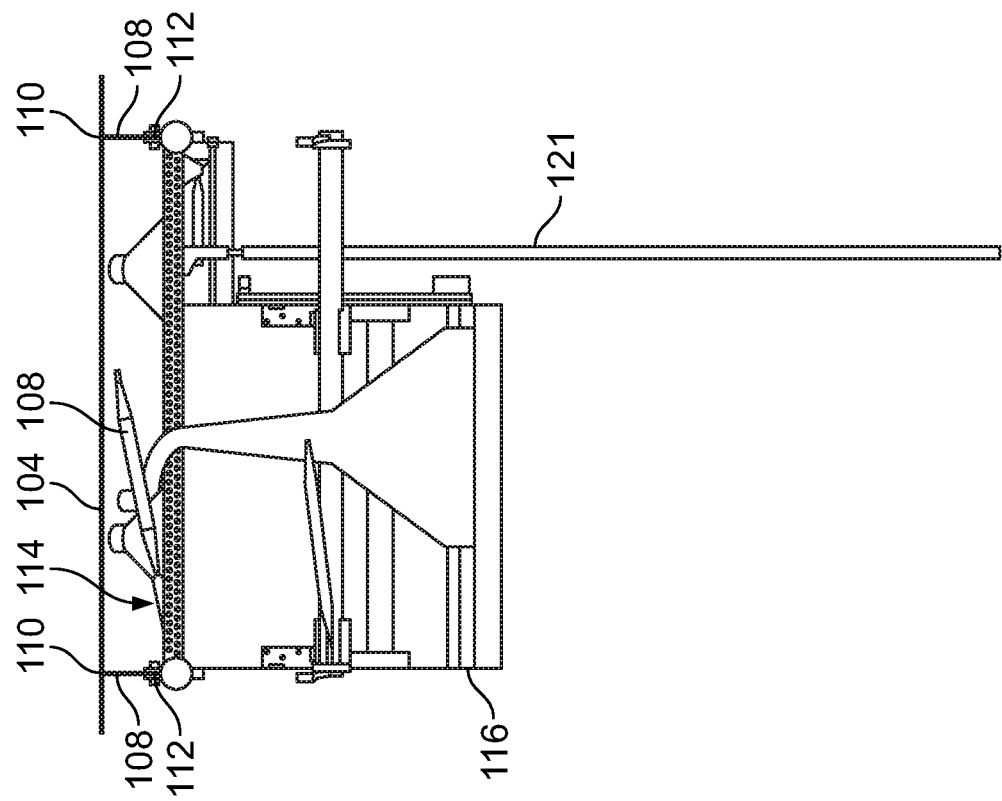
FIG. 7 illustrates an exterior lateral view of a stowage bin and a partition secured to an overhead support platform system, according to an embodiment of the present disclosure.

FIG. 7 illustrates an exterior lateral view of a stowage bin 116 and a partition 121 secured to an overhead support platform system 114, according to an embodiment of the present disclosure. The partition 121 is an example of another commodity that may be securely supported by the overhead support platform system 114.

As shown in FIGS. 6 and 7, a single overhead support platform system 114 may securely support multiple commodities. For example, the stowage bin 116 and the monument 118 may be secured to and supported by the overhead support platform system 114. In at least one embodiment, two stowage bins 116 may be secured to the overhead support platform system 114. In at least one other embodiment, two monuments 118 may be secured to the overhead support platform system 114. In at least one other embodiment, other commodities (such as the partition 121) may be secured to the overhead support platform system 114. Optionally, the overhead support platform system 114 may support a single commodity, such as a standard-sized stowage bin, which directly couples to the overhead support platform system 114, instead of the securing mounts 108.

Figure 8:
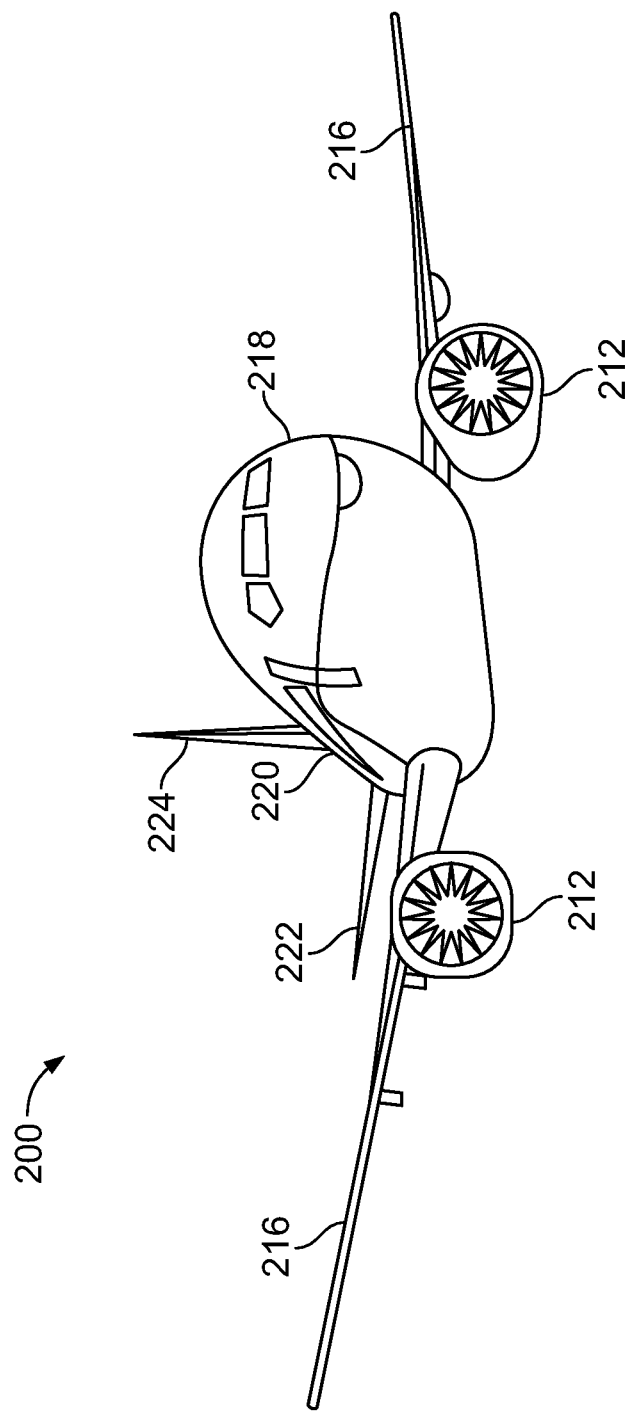
FIG. 8 illustrates a perspective front view of an aircraft, according to an embodiment of the present disclosure.

FIG. 8 illustrates a perspective front view of an aircraft 200, according to an embodiment of the present disclosure. The aircraft 200 is an example of the aircraft 100 shown in FIG. 1. The aircraft 200 includes an interior cabin, such as the interior cabin 106 shown in FIG. 1.

The aircraft 200 may include a propulsion system that may include two engines 212, for example. Optionally, the propulsion system may include more engines 212 than shown. The engines 212 are carried by wings 216 of the aircraft 200. In other embodiments, the engines 212 may be carried by a fuselage 218 and/or an empennage 220. The fuselage 218 is an example of the fuselage 102 shown in FIG. 1. The empennage 220 may also support horizontal stabilizers 222 and a vertical stabilizer 224. The wings 216, the horizontal stabilizers 222, and the vertical stabilizer 224 may each include one or more control surfaces.

Referring to FIGS. 1-8, the overhead support platform system 114 shown and described herein are used to securely support commodities at various desired positions within the interior cabin of the aircraft 200. Optionally, embodiments of the present disclosure may be used with respect to other vehicles (including automobiles, watercraft, spacecraft, and the like), buildings, and the like. For example, the overhead support platform systems 114 may be used within internal cabins of trains, buses, ships, spacecraft, or the like.

Figure 9:
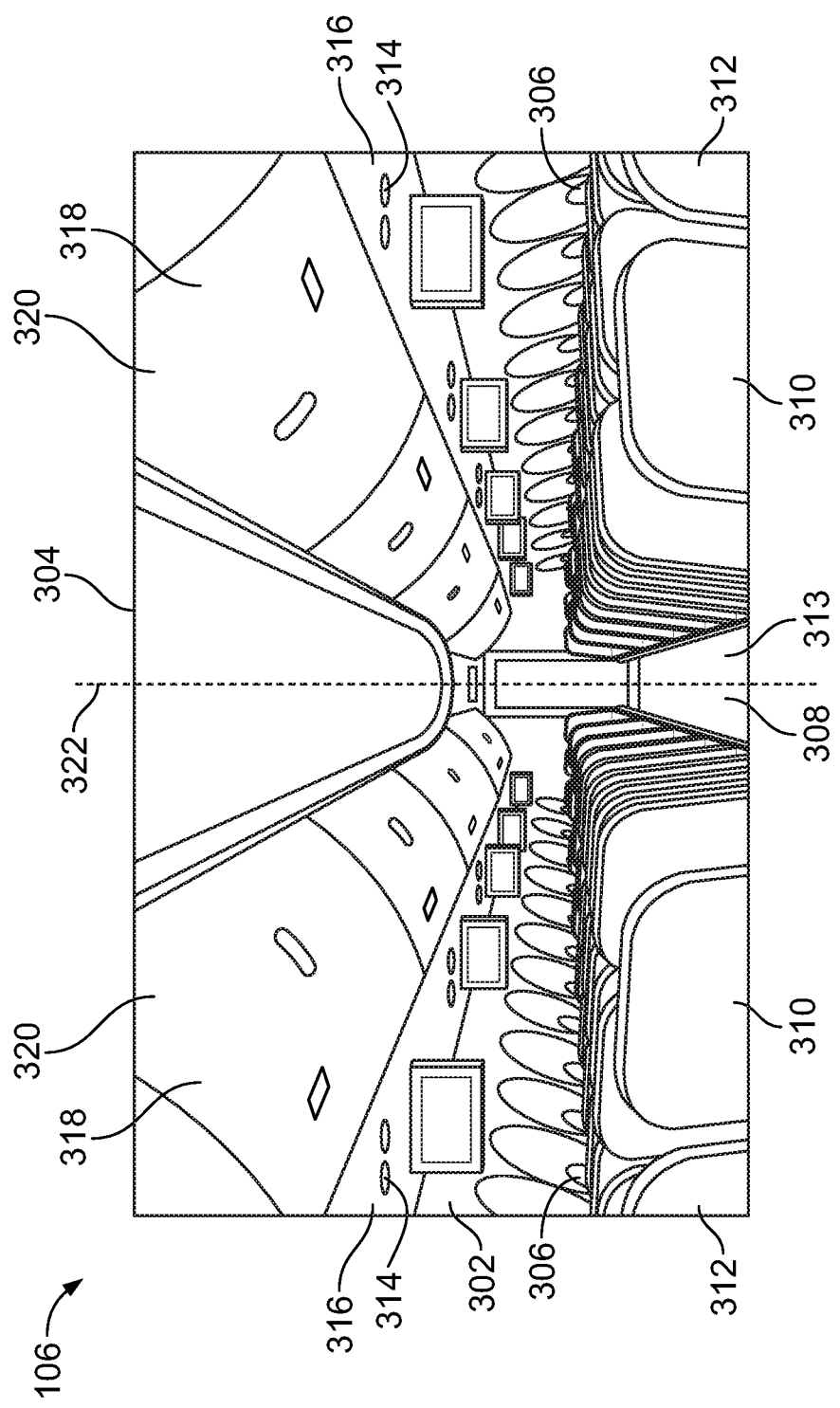
FIG. 9 illustrates a perspective interior view of an interior cabin of an aircraft, according to an embodiment of the present disclosure.

FIG. 9 illustrates a perspective interior view of an interior cabin 106 of an aircraft, according to an embodiment of the present disclosure. The interior cabin 106 includes outboard walls 302 connected to a ceiling 304. Windows 306 may be formed within the outboard walls 302. A floor 308 supports rows of seats 310. As shown in FIG. 9, a row 312 may include two seats 310 on either side of an aisle 313. However, the row 312 may include more or less seats 310 than shown. Additionally, the interior cabin 106 may include more aisles than shown.

Passenger service units (PSUs) 314 are secured between an outboard wall 302 and the ceiling 304 on either side of the aisle 313. The PSUs 314 extend between a front end and rear end of the interior cabin 106. For example, a PSU 314 may be positioned over each seat 310 within a row 312. Each PSU 314 may include a housing 316 that generally contains vents, reading lights, an oxygen bag drop panel, an attendant request button, and other such controls over each seat 310 (or groups of seats) within a row 312. The PSUs 314 are mounted to a PSU rail (hidden from view in FIG. 9), such as the PSU rail 120. As noted, the PSU rail 120 is not the overhead support platform system 114, nor does the PSU rail 120 form a portion of the overhead support platform system 114.

Overhead stowage bin assemblies 318 are secured to the ceiling 304 and/or the outboard wall 302 above and inboard from the PSU 314 on either side of the aisle 313. The overhead stowage bin assemblies 318 are examples of the stowage bin 116 shown in FIG. 1. The overhead stowage bin assemblies 318 are secured over the seats 310. The overhead stowage bin assemblies 318 extend between the front and rear end of the internal cabin 106. Each stowage bin assembly 318 may include a pivot bin or bucket 320 pivotally secured to a strongback (hidden from view in FIG. 9), which, in turn, is securely supported by an overhead support platform system 114 (shown in FIG. 1). The overhead stowage bin assemblies 318 may be positioned above and inboard from lower surfaces of the PSUs 314. The overhead stowage bin assemblies 318 are configured to be pivoted open in order to receive passenger carry-on baggage and personal items, for example.

As used herein, the term "outboard" means a position that is further away from a central longitudinal plane 322 of the internal cabin 106 as compared to another component. The term "inboard" means a position that is closer to the central longitudinal plane 322 of the internal cabin 106 as compared to another component. For example, a lower surface of a PSU 314 may be outboard in relation to a stowage bin assembly 318.

Figure 10:
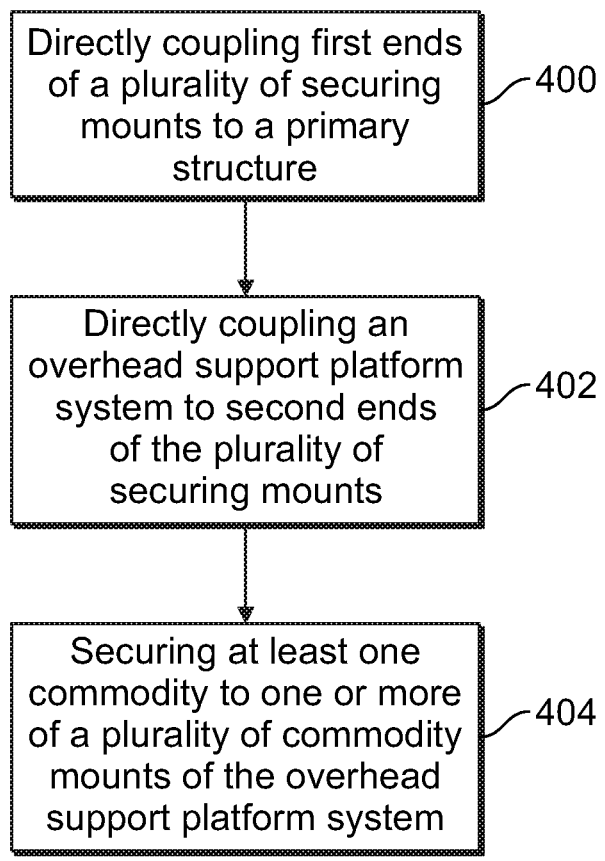
FIG. 10 illustrates a flow chart of a method of adaptively supporting at least one commodity within an interior cabin of a vehicle, according to an embodiment of the present disclosure.

FIG. 10 illustrates a flow chart of a method of adaptively supporting at least one commodity within an interior cabin of a vehicle, according to an embodiment of the present disclosure. In at least one embodiment, the method includes directly coupling (400) first ends of a plurality of securing mounts to a primary structure within the interior cabin, directly coupling (402) an overhead support platform system to second ends of the plurality of securing mounts, and securing (404) the commodit(ies) to one or more of a plurality of commodity mounts of the overhead support platform system.

As described herein, embodiments of the present disclosure provide systems and methods of efficiently coupling commodities to a primary structure of an aircraft. Further, embodiments of the present disclosure provide standard and uniform secondary support systems to which various different internal components of a vehicle may be secured. Embodiments of the present disclosure provide adaptable, cost-efficient systems and methods of securing various components within an interior cabin of an aircraft. Moreover, embodiments of the present disclosure provide common installation systems and methods that may be used throughout an interior cabin of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §

112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An overhead support platform system configured to mount to a primary structure of a vehicle through one or more securing mounts, wherein at least one commodity within an internal structure of the vehicle is configured to mount to the overhead support platform system, the overhead support platform system comprising:
    a first adapter rail; and
    a second adapter rail coupled to the first adapter rail,
    wherein each of the first adapter rail and the second adapter rail comprises a plurality of commodity mounts, wherein the at least one commodity is configured to be adaptively secured to one or more of the plurality of commodity mounts, and
    wherein a length of one or both of the first adapter rail or the second adapter rail equals a length of a standard-sized stowage bin.

2. The overhead support platform system of claim 1, further comprising a plurality of attachment fittings that directly couple to lower ends of a plurality of securing mounts, wherein the plurality of attachment fittings correspond to attachment locations for the standard-sized stowage bin.

3. The overhead support platform system of claim 1, wherein the at least one commodity comprises one or both of a stowage bin or a monument.

4. The overhead support platform system of claim 1, further comprising one or more cross beams that couple the first adapter rail to the second adapter rail.

5. The overhead support platform system of claim 1, wherein one of both of the first adapter rail or the second adapter rail comprises:
    a lower beam;
    an upper beam; and
    a panel that connects the lower beam to the upper beam, wherein the panel comprises the plurality of commodity mounts uniformly-spaced along a length of the panel.

6. The overhead support platform system of claim 5, wherein each of the plurality of commodity mounts comprises a fastener through-hole.

7. The overhead support platform system of claim 1, further comprising at least one threshold closeout bracket secured laterally away and below one or both of the first adapter rail or the second adapter rail.

8. The overhead support platform system of claim 7, wherein the at least one threshold closeout bracket comprises at least one air passage.

9. The overhead support platform system of claim 7, further comprising one or both of a lighting assembly or a plenum secured to the at least one threshold closeout bracket.

10. The overhead support platform system of claim 1, further comprising at least one support rail that supports the at least one commodity.

11. The overhead support platform system of claim 1, further comprising a first plurality of attachment locations and interfaces that are the same as a second plurality of attachment locations and interfaces of the standard-sized stowage bin.

12. The overhead support platform system of claim 1, wherein the one or more securing mounts comprise struts and tie-rods.

13. A vehicle comprising:
    an interior cabin;
    a primary structure within the interior cabin;
    a plurality of securing mounts having first ends directly coupled to the primary structure, and second ends;
    an overhead support platform system directly coupled to the second ends of the plurality of securing mounts, wherein the overhead support platform system comprises a first adapter rail, and a second adapter rail coupled to the first adapter rail, wherein each of the first adapter rail and the second adapter rail comprises a plurality of commodity mounts, and wherein a length of one or both of the first adapter rail or the second adapter rail equals a length of a standard-sized stowage bin; and
    at least one commodity directly coupled to the overhead support platform system, wherein the at least one commodity is adaptively secured to one or more of the plurality of commodity mounts.

14. The vehicle of claim 13, further comprising a passenger service unit (PSU) rail coupled to the at least one commodity, wherein the PSU rail is separate and distinct from the overhead support platform system.

15. The vehicle of claim 13, wherein the overhead support platform system further comprises a plurality of attachment fittings that directly couple to the second ends of the plurality of securing mounts, wherein the plurality of attachment fittings correspond to attachment locations for the standard-sized stowage bin.

16. The vehicle of claim 13, wherein the at least one commodity comprises one or both of a stowage bin or a monument.

17. The vehicle of claim 13, wherein one or both of the first adapter rail or the second adapter rail comprises:
    a lower beam;
    an upper beam; and
    a panel that connects the lower beam to the upper beam, wherein the panel comprises the plurality of commodity mounts uniformly-spaced along a length of the panel.

18. The vehicle of claim 13, further comprising one or more cross beams that couple the first adapter rail to the second adapter rail.

19. The vehicle of claim 13, further comprising a first plurality of attachment locations and interfaces that are the same as a second plurality of attachment locations and interfaces of the standard-sized stowage bin, and wherein the plurality of securing mounts comprise struts and tie-rods.

20. An overhead support platform system configured to mount to a primary structure of a vehicle through one or more securing mounts, wherein the one or more securing mounts comprise struts and tie-rods, wherein at least one commodity within an internal structure of the vehicle is configured to mount to the overhead support platform system, the overhead support platform system comprising:
- a first adapter rail;
- a second adapter rail coupled to the first adapter rail, wherein each of the first adapter rail and the second adapter rail comprises a lower beam, an upper beam, and a panel that connects the lower beam to the upper beam, wherein the panel comprises a plurality of commodity mounts uniformly-spaced along a length of the panel, wherein the at least one commodity is configured to be adaptively secured to one or more of the plurality of commodity mounts, and wherein a length of each of the first adapter rail and the second adapter rail equals a length of the standard-sized stowage bin;
- one or more cross beams that couple the first adapter rail to the second adapter rail;
- a threshold closeout bracket secured laterally away and below one of the first adapter rail or the second adapter rail; and
- a first plurality of attachment locations and interfaces that are the same as a second plurality of attachment locations and interfaces of the standard-sized stowage bin.

* * * * *